(12) United States Patent
Huang et al.

(10) Patent No.: US 11,516,901 B1
(45) Date of Patent: Nov. 29, 2022

(54) LAMP CONTROL APPARATUS WITH MULTIPLE INPUT MODES AND POWER SUPPLY

(71) Applicant: Changzhou Jutai Electronic Co., Ltd., Jiangsu (CN)

(72) Inventors: Wei Huang, Jiangsu (CN); Min Fang, Jiangsu (CN); Chengqian Pan, Jiangsu (CN)

(73) Assignee: Changzhou Jutai Electronic Co., Ltd., Changzhou (CN)

( * ) Notice: Subject to any disclaimer, the term of this patent is extended or adjusted under 35 U.S.C. 154(b) by 0 days.

(21) Appl. No.: 17/492,561

(22) Filed: Oct. 2, 2021

(30) Foreign Application Priority Data

Aug. 28, 2021 (CN) .......................... 2021220490780

(51) Int. Cl.
| | |
|---|---|
| *H05B 47/12* | (2020.01) |
| *H05B 47/17* | (2020.01) |
| *H05B 45/20* | (2020.01) |
| *H05B 45/10* | (2020.01) |

(52) U.S. Cl.
CPC ............. *H05B 47/12* (2020.01); *H05B 45/10* (2020.01); *H05B 45/20* (2020.01); *H05B 47/17* (2020.01)

(58) Field of Classification Search
CPC ........ H05B 47/12; H05B 45/20; H05B 47/17; H05B 45/10; H05B 47/105; H05B 47/10; H05B 47/00; H05B 47/115; H05B 45/00; F21V 15/01; F21V 23/00; F21V 23/003; F21V 23/004; F21V 23/006; F21V 23/007; F21V 23/008; F21V 23/0407; F21V 23/0435
See application file for complete search history.

(56) References Cited

U.S. PATENT DOCUMENTS

| | | | | |
|---|---|---|---|---|
| 10,617,022 | B2* | 4/2020 | Huang | ................ H05K 5/0069 |
| 2017/0135166 | A1* | 5/2017 | Huang | ................... H01H 13/06 |
| 2018/0368272 | A1* | 12/2018 | Huang | ................ H01R 12/718 |
| 2019/0274206 | A1* | 9/2019 | Altamura | .............. F21V 23/003 |

* cited by examiner

*Primary Examiner* — Bao Q Truong
(74) *Attorney, Agent, or Firm* — Dragon Sun Law Firm, PC; Jinggao Li; Nathaniel Perkins

(57) ABSTRACT

The application discloses a lamp-control apparatus with multiple input modes including a housing, a circuit board arranged in the housing, a flash mode switching module, a sound-controlled flash mode input circuit for receiving external environment sound waves and sending a control command to a control circuit. The control circuit for controlling a light emitting mode of a lamp is arranged on the circuit board. The flash mode switching module and the sound-controlled flash mode input circuit are respectively and electrically connected to the control circuit. The sound-controlled flash mode input circuit includes a pickup device that is located inside the housing. One or more through holes for transmitting the sound waves to the pickup device are formed in the position where the pickup device is mounted on the housing. which has the advantages that the pickup device does not need to be led out of the housing through a lead wire, so that the connection between the pickup device and the circuit board is prevented from being damaged due to pulling the lead wire.

10 Claims, 30 Drawing Sheets

LAMP CONTROL APPARATUS WITH MULTIPLE INPUT MODES AND POWER SUPPLY

CROSS REFERENCE

This application claims the priority benefit of Chinese Patent Application No. CN2021220490780, filed on Aug. 28, 2021, the content of which is hereby incorporated by reference in its entirety.

TECHNICAL FIELD

The present utility model relates to a lamp control apparatus with multiple input modes and a power supply.

BACKGROUND

An LED (Light Emitting Diode) lamp string or lamp strip is commonly connected to a driving power supply. The driving power supply includes a housing, a circuit board, and a button. The circuit board generates a control signal by pressing the button, so as to change a flash mode of the LED lamp string or lamp string and achieve different flash effects. The button is arranged on the driving power supply. During an operation, the flash effect is operated through the button.

With the development of intelligent communication, a mobile phone communicates with a wireless communication module on the driving power supply, and a control instruction sent by operating on the mobile phone controls the flash mode of an LED lamp, so as to be applied to the inside of the power supply or used independently. The LED lamp has a plurality of flash modes, and has the functions of setting on and off of a time point, dimming and changing the flash speed and brightness of the lamp along with the rhythm and volume of music played by the mobile phone. Through the regulation and control of the mobile phone, the remote control distance of a product is ensured to reach 30 m in the open air, the interconnection of the mobile phone and the driving power supply is realized, and the light emitting state of the LED lamp is operated through the mobile phone, so that the operation of the product is not mechanized or limited, and the user can remotely and visually operate the light emitting state of the LED lamp.

The premise of intelligent communication of the abovementioned driving power supply is that the mobile phone and the driving power supply need to maintain a communication state. Once the communication between the mobile phone and the driving power supply is interrupted, the flash mode of the lamp cannot be changed.

SUMMARY

The present utility model provides a conveniently operated lamp control apparatus with multiple input modes and a power supply.

Technical solutions for solving the abovementioned technical problems are as follows:

A lamp control apparatus with multiple input modes includes a housing, a circuit board arranged in the housing, a flash mode switching module, a sound-controlled flash mode input circuit for receiving external environment sound waves and sending a control command to a control circuit. The control circuit for controlling a light emitting mode of a lamp is arranged on the circuit board. The flash mode switching module and the sound-controlled flash mode input circuit are respectively and electrically connected to the control circuit. The sound-controlled flash mode input circuit includes a pickup device. The pickup device is located inside the housing. One or more through holes for transmitting the sound waves to the pickup device are formed in the position where the pickup device is mounted on the housing.

The lamp control apparatus with multiple input modes includes a power supply, and a lamp controller. The power supply is electrically connected to the control circuit in the lamp controller.

In the present embodiment, the pickup device is arranged inside the housing, which has the advantages that the pickup device does not need to be led out of the housing through a lead wire, so that the connection between the pickup device and the circuit board is prevented from being damaged due to pulling the lead wire. The pickup device and the housing form a whole body after being fixed, the stability of the pickup device is good, and the controller is very convenient during use.

DETAILED DESCRIPTION OF THE EMBODIMENTS

As shown in FIG. 1 to FIG. 28, a lamp control apparatus with multiple input modes of the present utility model includes a housing 1, a circuit board 2 arranged in the housing 1, a flash mode switching module 3, a sound-controlled flash mode input circuit for receiving external environment sound waves and sending a control command to a control circuit. The control circuit for controlling a light emitting mode of a lamp is arranged on the circuit board 2. The flash mode switching module 3 is electrically connected to the control circuit. The flash mode switching module 3 is a button SW, an infrared receiver TX1, a Bluetooth module, or a WIFI module. The flash mode switching module 3 and the sound-controlled flash mode input circuit are respectively and electrically connected to the control circuit.

The control circuit includes a microcontroller U2 and a driving circuit connected to an output end of the microcontroller U2. The microcontroller U2 is a single chip microcomputer. The microcontroller U2 is connected to an oscillating circuit. The oscillating circuit includes a crystal oscillator XL1, a fourteenth capacitor C14, and a fifteenth capacitor C15. One end of LED 1 is electrically connected to an eighteenth resistor R18, and the other end of LED 1 is grounded through a twentieth resistor R20. LED 1 is a power indicating lamp, and the lamp is on after being powered on. One end of LED 2 is connected to the microcontroller U2, and the other end of LED 2 is grounded through a nineteenth resistor R19. LED 2 is a timing indicating lamp, and the lamp is on after entering a timing working mode. The driving circuit may be a bridge driving circuit formed by connecting four triodes in FIG. 1, and may also be a driving circuit shown in FIG. 2 and FIG. 3.

Figure 1:
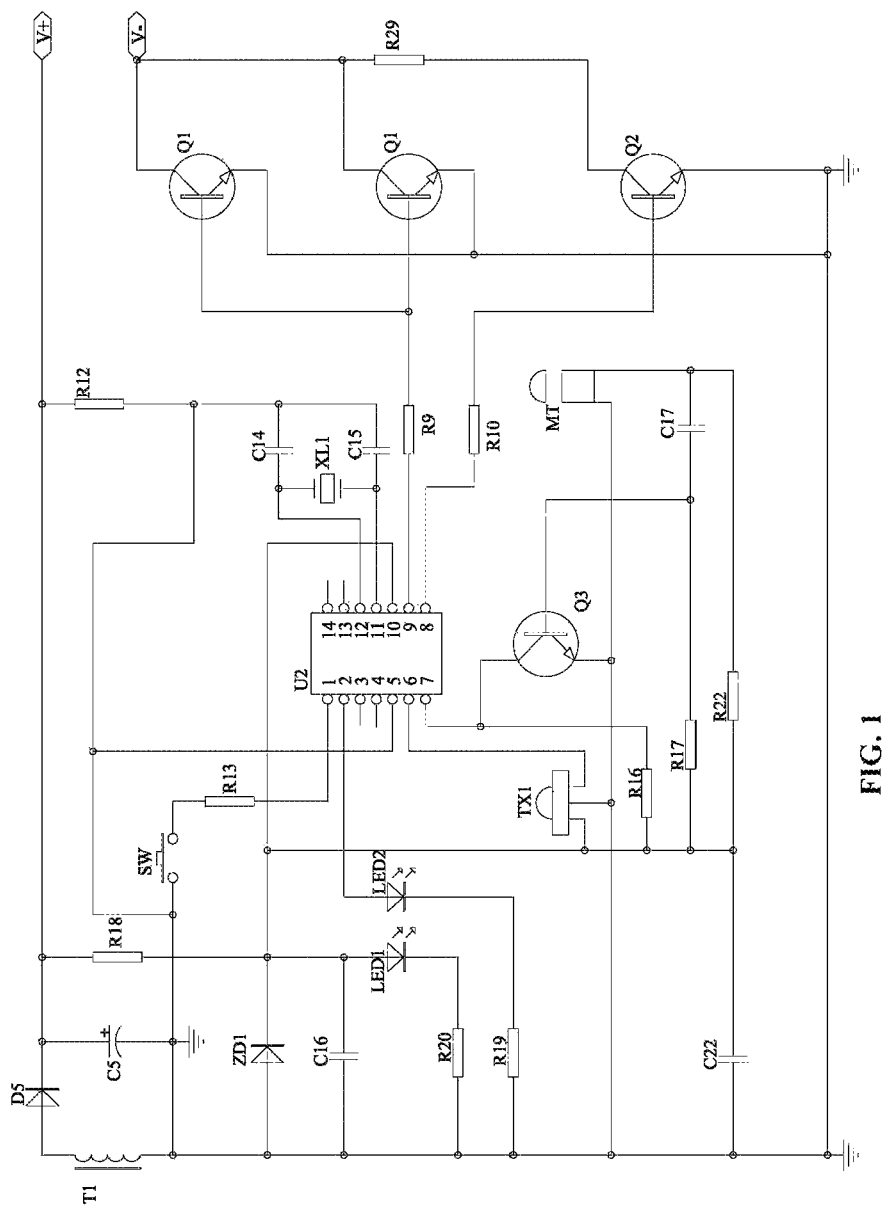
FIG. 1 is a schematic diagram of a first embodiment of a control circuit in a lamp control apparatus with multiple input modes.
Figure 4:
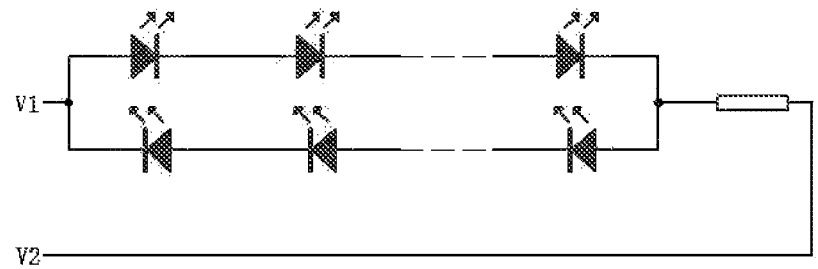
FIG. 4 is a schematic diagram of a common two-wire two-way LED lamp string.
Figure 5:
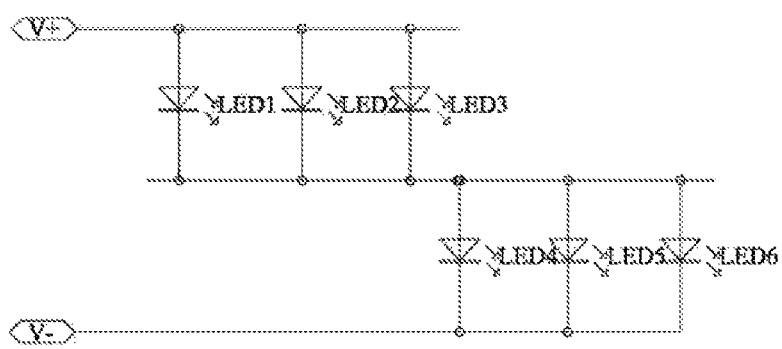
FIG. 5 and FIG. 6 are schematic diagrams of a synchronous colorful Red Green Blue (RGB)/LED light string.
Figure 6:
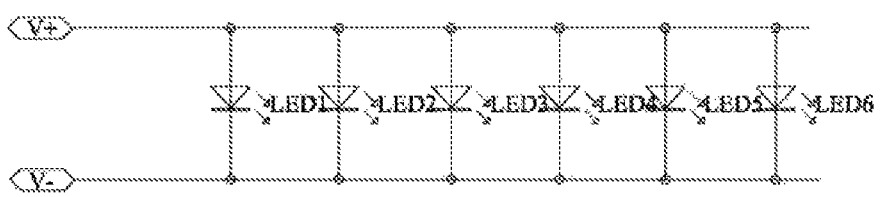
Figure 7A:
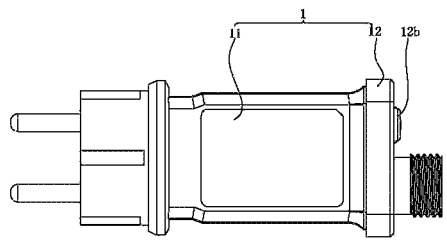
FIG. 7a to FIG. 7f are six-side views of the appearance of a first lamp control apparatus with multiple input modes.
Figure 7B:
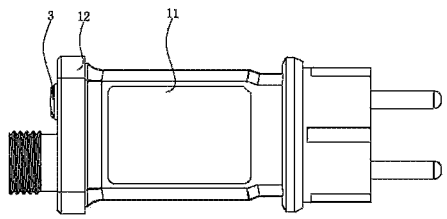
Figure 7C:
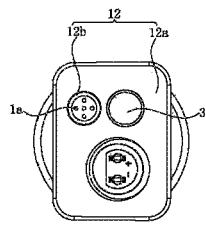
Figure 7D:
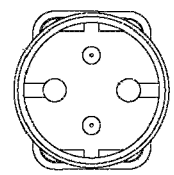
Figure 7E:
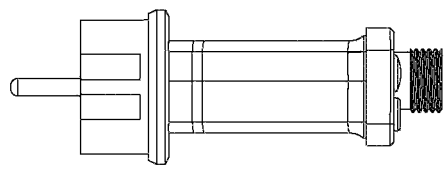
Figure 7F:
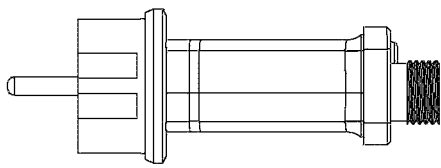
Figure 7G:
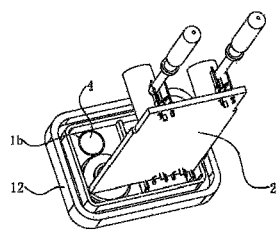
FIG. 7g is an internal structure diagram of the first lamp control apparatus with multiple input modes.
Figure 8A:
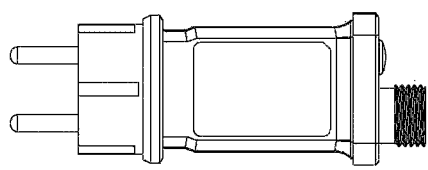
FIG. 8a to FIG. 8f are six-side views of the appearance of a second first lamp control apparatus with multiple input modes.
Figure 8B:
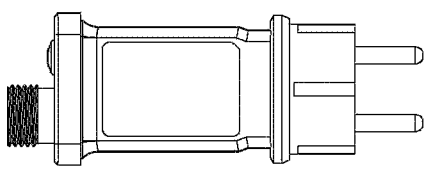
Figure 8C:
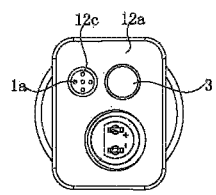
Figure 8D:
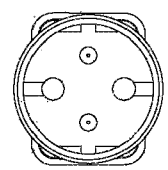
Figure 8E:
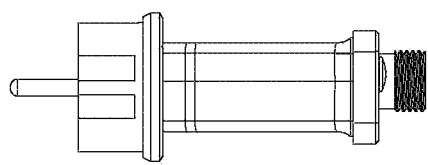
Figure 8F:
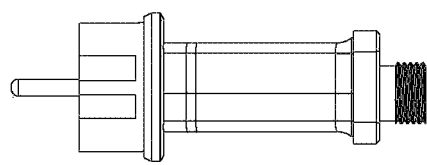
Figure 9A:
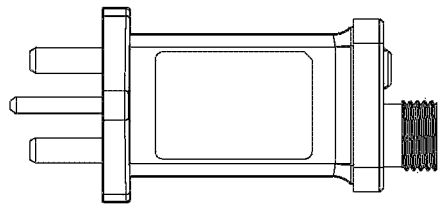
FIG. 9a to FIG. 9f are six-side views of the appearance of a third first lamp control apparatus with multiple input modes.
Figure 9B:
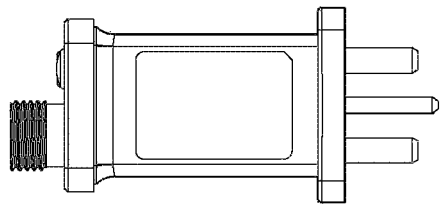
Figure 9C:
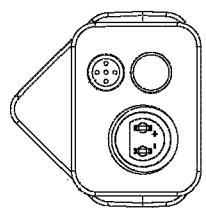
Figure 9D:
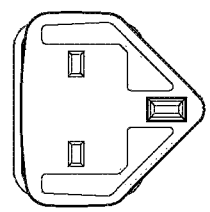
Figure 9E:
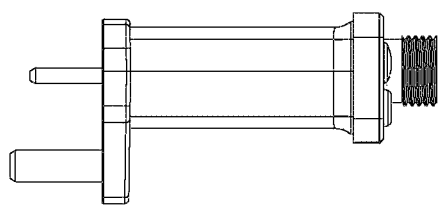
Figure 9F:
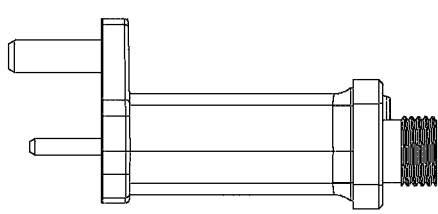
Figure 10A:
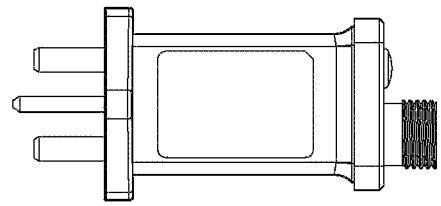
FIG. 10a to FIG. 10f are six-side views of the appearance of a fourth lamp control apparatus with multiple input modes.
Figure 10B:
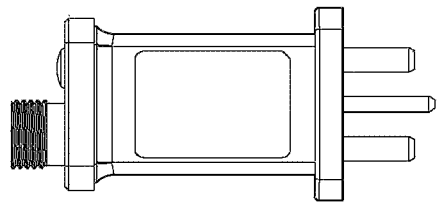
Figure 10C:
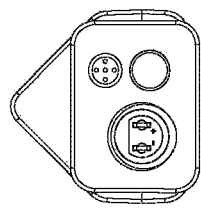
Figure 10D:
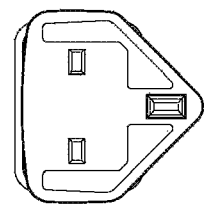
Figure 10E:
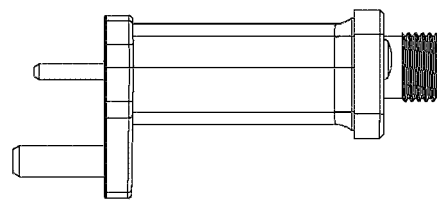
Figure 10F:
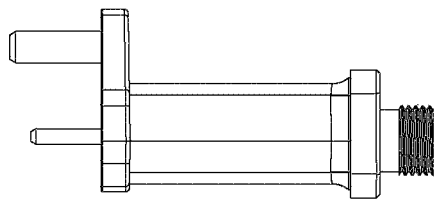
Figure 11A:
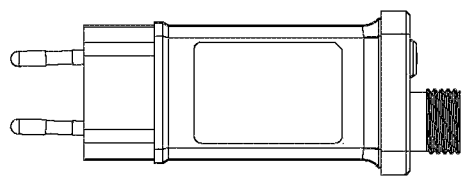
FIG. 11a to FIG. 11f are six-side views of the appearance of a fifth lamp control apparatus with multiple input modes.
Figure 11B:
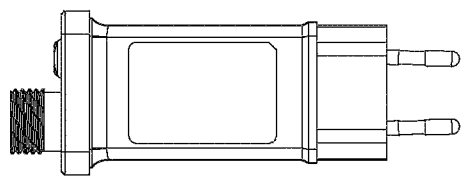
Figure 11C:
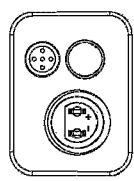
Figure 11D:
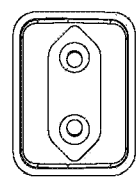
Figure 11E:
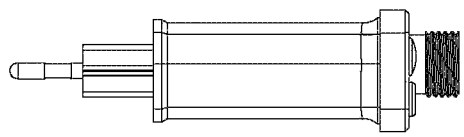
Figure 11F:
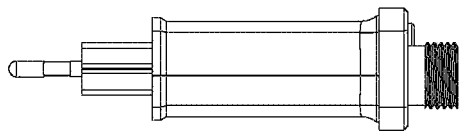
Figure 12A:
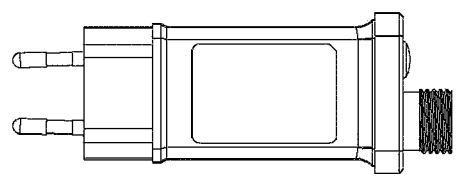
FIG. 12a to FIG. 12f are six-side views of the appearance of a sixth lamp control apparatus with multiple input modes.
Figure 12B:
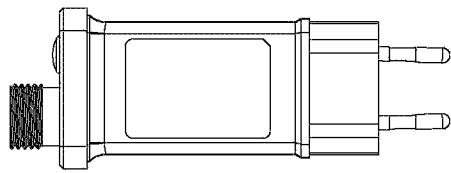
Figure 12C:
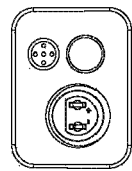
Figure 12D:
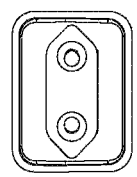
Figure 12E:
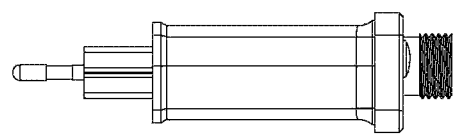
Figure 12F:
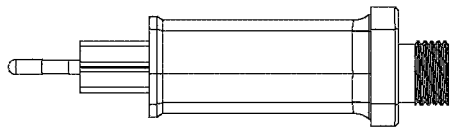
Figure 13A:
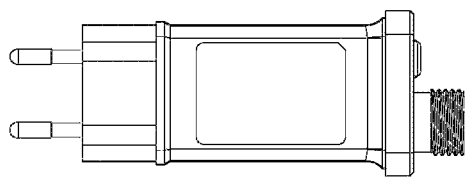
FIG. 13a to FIG. 13f are six-side views of the appearance of a seventh lamp control apparatus with multiple input modes.
Figure 13B:
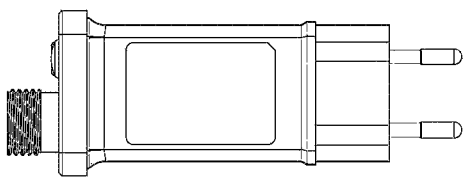
Figure 13C:
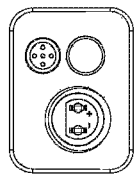
Figure 13D:
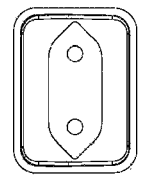
Figure 13E:
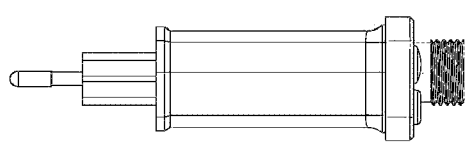
Figure 13F:
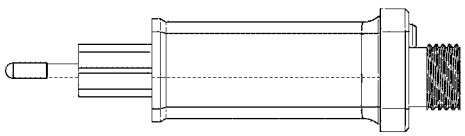
Figure 14A:
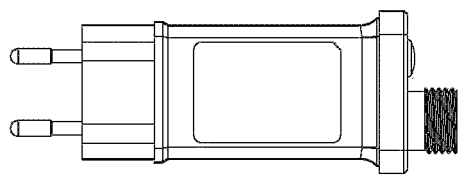
FIG. 14a to FIG. 14f are six-side views of the appearance of an eighth lamp control apparatus with multiple input modes.
Figure 14B:
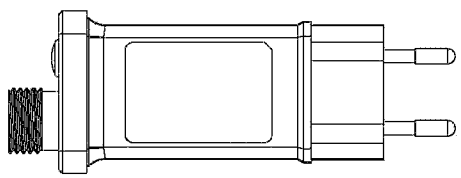
Figure 14C:
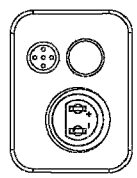
Figure 14D:
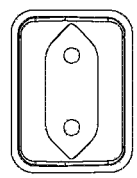
Figure 14E:
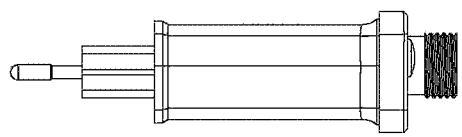
Figure 14F:
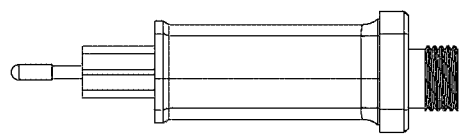
Figure 15A:
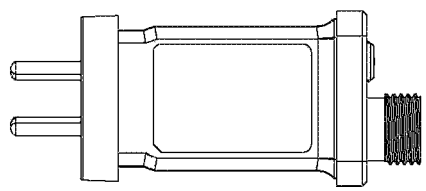
FIG. 15a to FIG. 15f are six-side views of the appearance of a ninth lamp control apparatus with multiple input modes.
Figure 15B:
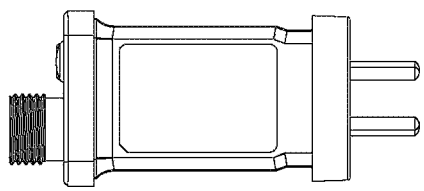
Figure 15C:
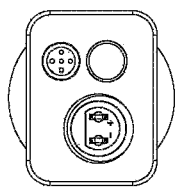
Figure 15D:
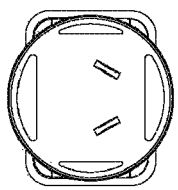
Figure 15E:
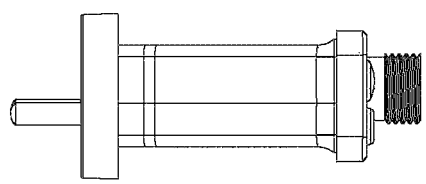
Figure 15F:
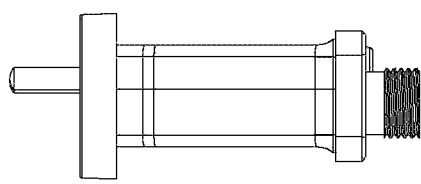
Figure 16A:
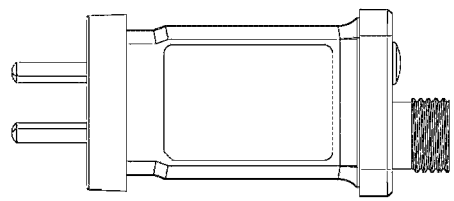
FIG. 16a to FIG. 16f are six-side views of the appearance of a tenth lamp control apparatus with multiple input modes.
Figure 16B:
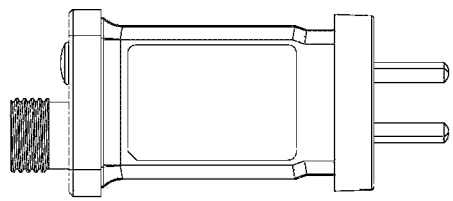
Figure 16C:
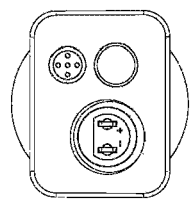
Figure 16D:
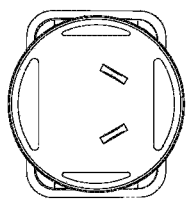
Figure 16E:
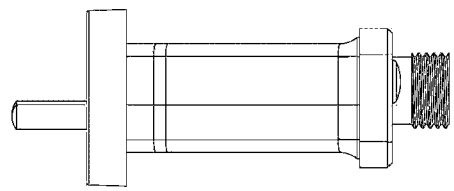
Figure 16F:
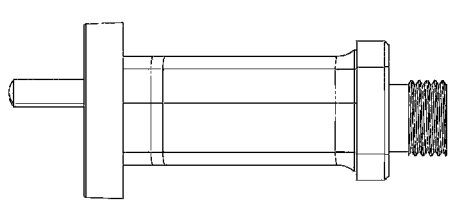
Figure 17A:
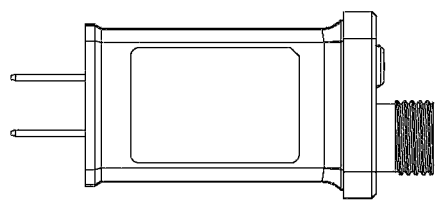
FIG. 17a to FIG. 17f are six-side views of the appearance of an eleventh lamp control apparatus with multiple input modes.
Figure 17B:
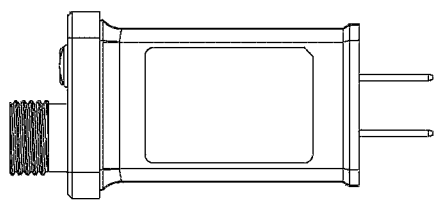
Figure 17C:
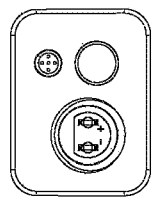
Figure 17D:
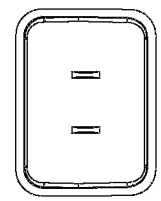
Figure 17E:
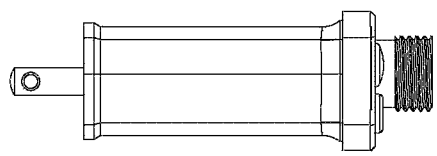
Figure 17F:
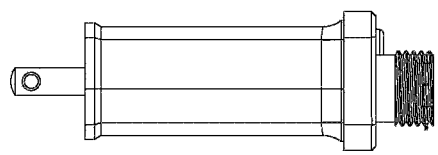
Figure 18A:
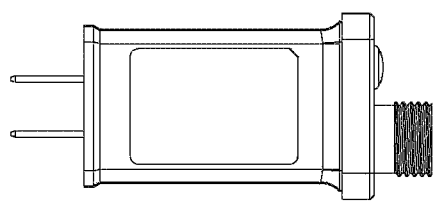
FIG. 18a to FIG. 18f are six-side views of the appearance of a twelves lamp control apparatus with multiple input modes.
Figure 18B:
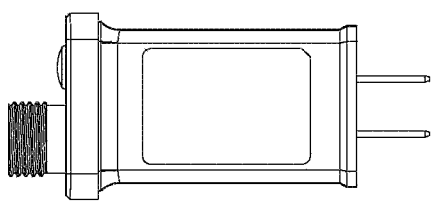
Figure 18C:
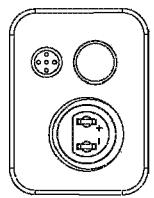
Figure 18D:
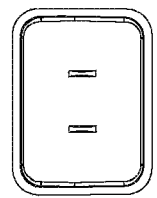
Figure 18E:
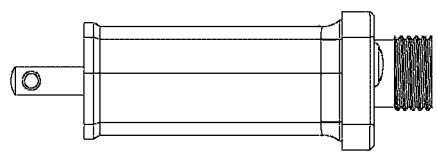
Figure 18F:
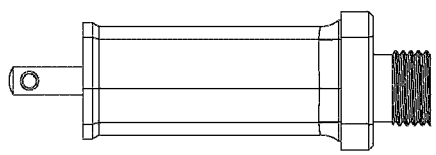
Figure 19A:
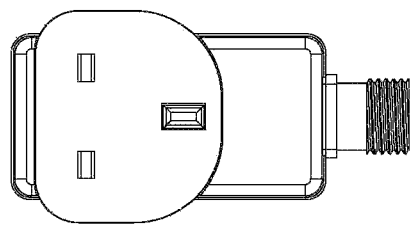
FIG. 19a to FIG. 19f are six-side views of the appearance of a thirteenth lamp control apparatus with multiple input modes.
Figure 19B:
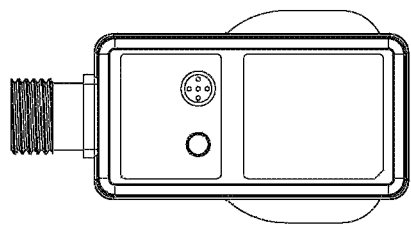
Figure 19C:
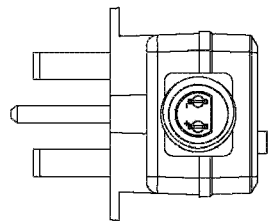
Figure 19D:
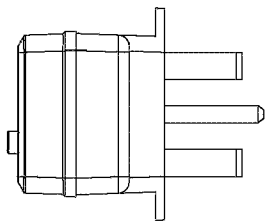
Figure 19E:
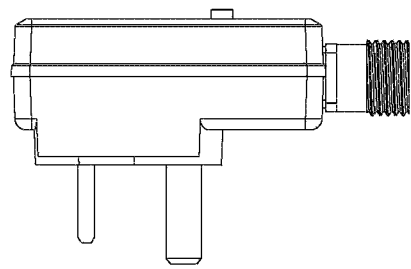
Figure 19F:
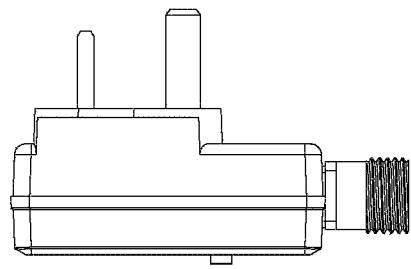
Figure 20A:
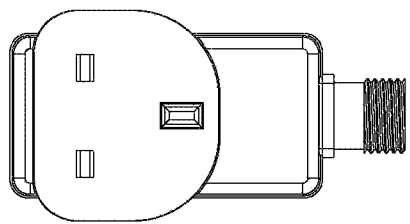
FIG. 20a to FIG. 20f are six-side views of the appearance of a fourteenth lamp control apparatus with multiple input modes.
Figure 20B:
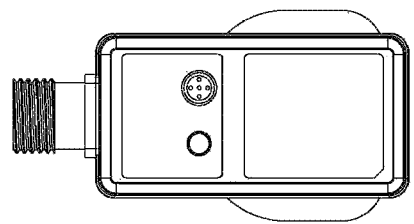
Figure 20C:
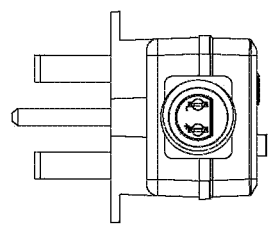
Figure 20D:
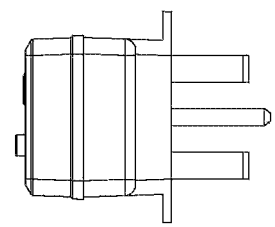
Figure 20E:
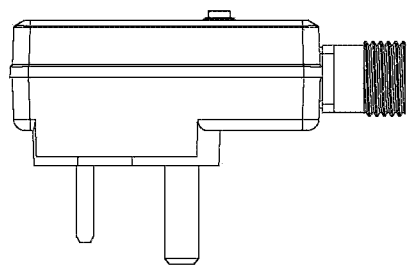
Figure 20F:
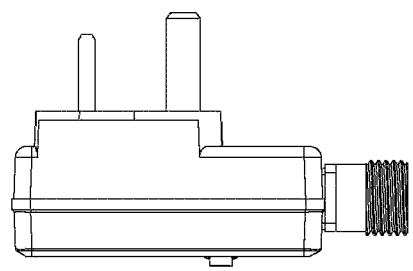
Figure 21A:
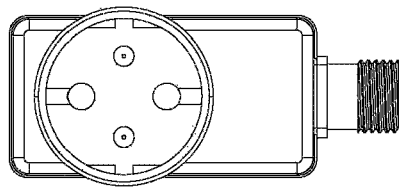
FIG. 21a to FIG. 21f are six-side views of the appearance fifth a fifteenth lamp control apparatus with multiple input modes.
Figure 21B:
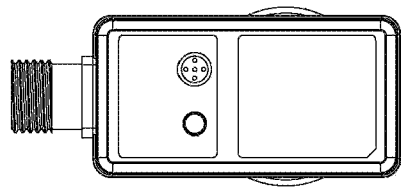
Figure 21C:
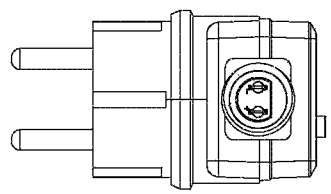
Figure 21D:
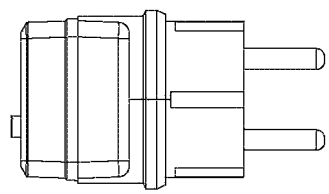
Figure 21E:
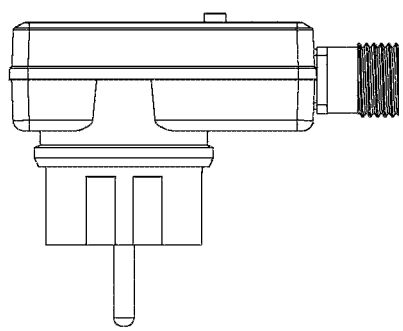
Figure 21F:
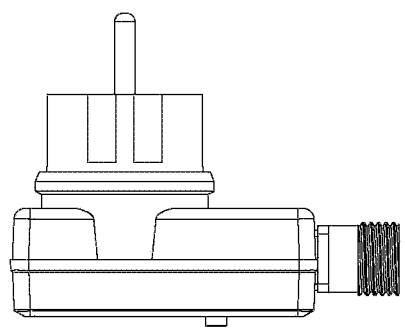
Figure 22A:
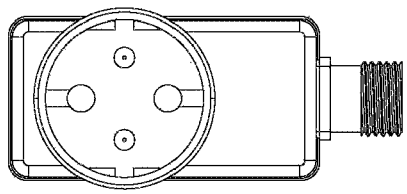
FIG. 22a to FIG. 22f are six-side views of the appearance sixth a sixteenth lamp control apparatus with multiple input modes.
Figure 22B:
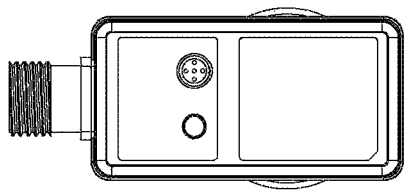
Figure 22C:
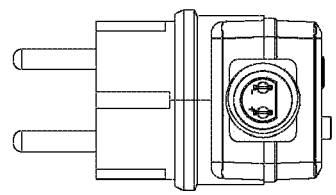
Figure 22D:
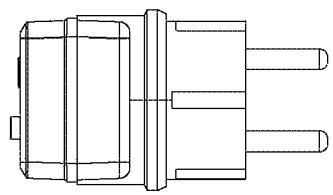
Figure 22E:
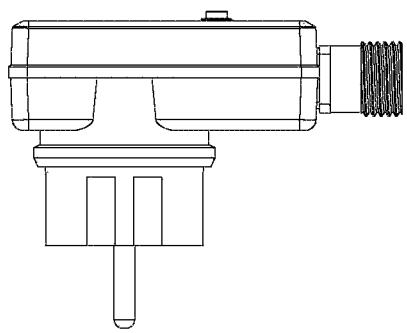
Figure 22F:
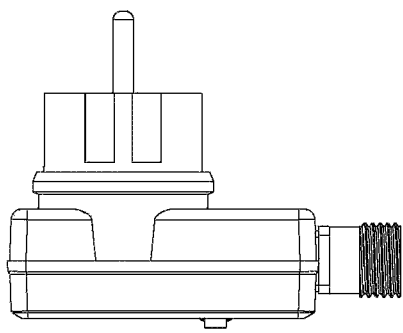
Figure 23A:
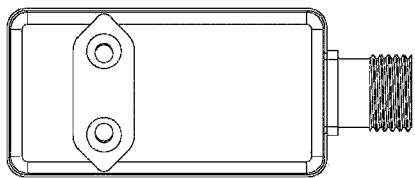
FIG. 23a to FIG. 23f are six-side views of the appearance of a seventeenth lamp control apparatus with multiple input modes.
Figure 23B:
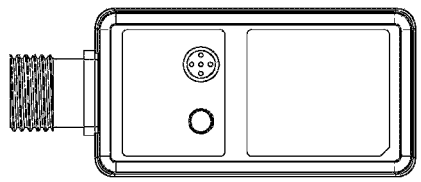
Figure 23C:
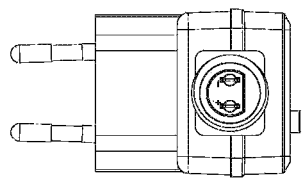
Figure 23D:
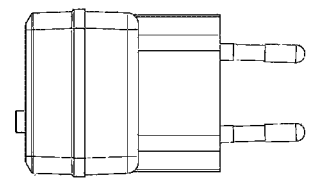
Figure 23E:
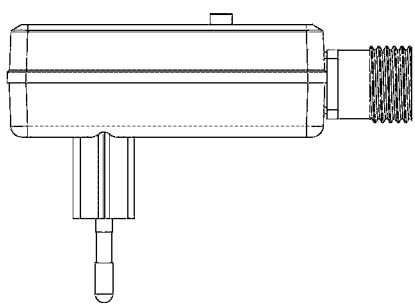
Figure 23F:
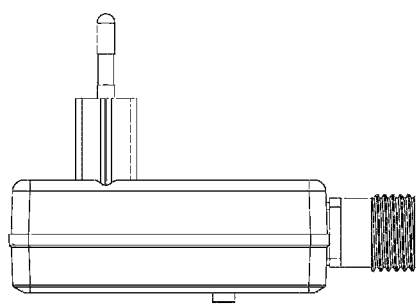
Figure 24A:
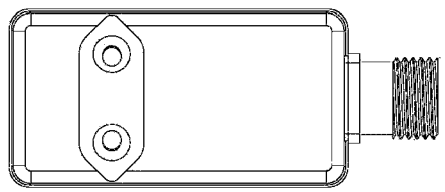
FIG. 24a to FIG. 24f are six-side views of the appearance of an eighteenth lamp control apparatus with multiple input modes.
Figure 24B:
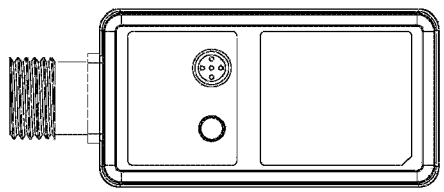
Figure 24C:
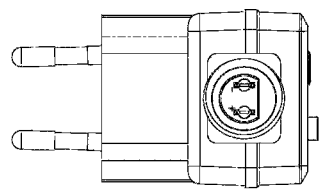
Figure 24D:
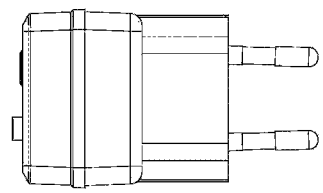
Figure 24E:
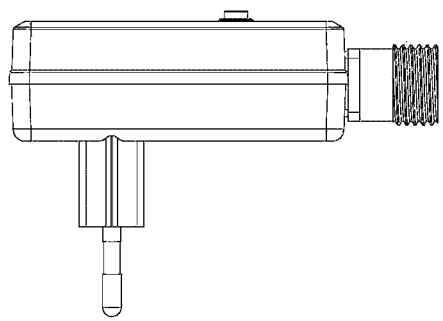
Figure 24F:
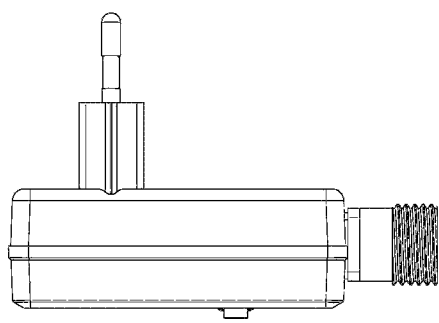
Figure 25A:
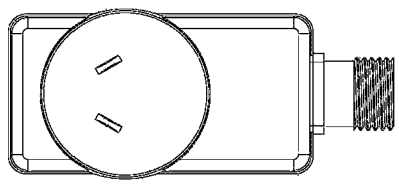
FIG. 25a to FIG. 25f are six-side views of the appearance of a nineteenth lamp control apparatus with multiple input modes.
Figure 25B:
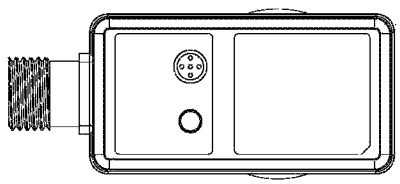
Figure 25C:
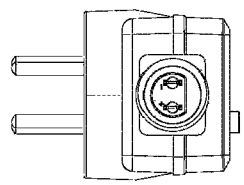
Figure 25D:
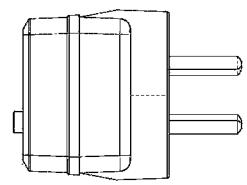
Figure 25E:
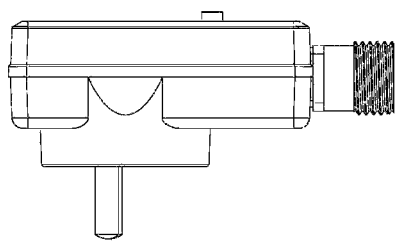
Figure 25F:
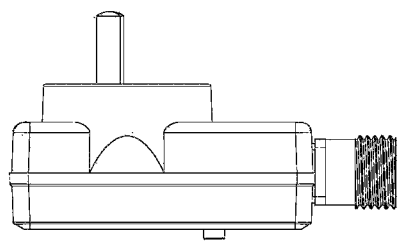
Figure 26A:
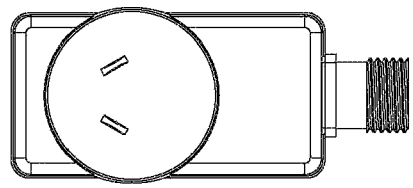
FIG. 26a to FIG. 26f are six-side views of the appearance of a twentieth lamp control apparatus with multiple input modes.
Figure 26B:
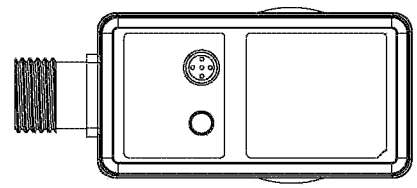
Figure 26C:
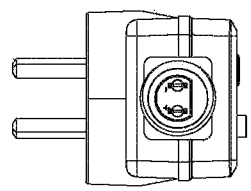
Figure 26D:
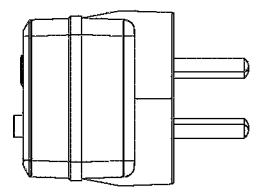
Figure 26E:
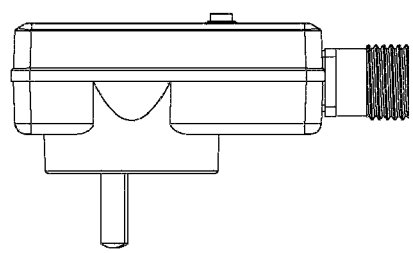
Figure 26F:
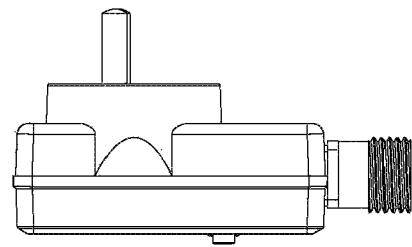
Figure 27A:
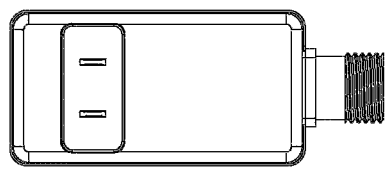
FIG. 27a to FIG. 27f are six-side views of the appearance of a twenty-first lamp control apparatus with multiple input modes.
Figure 27B:
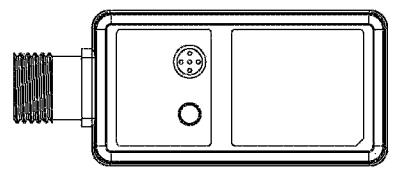
Figure 27C:
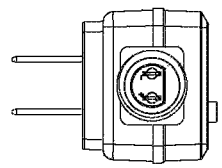
Figure 27D:
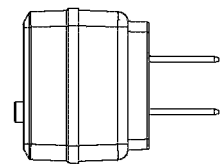
Figure 27E:
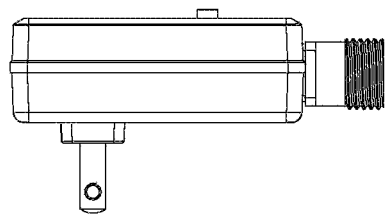
Figure 27F:
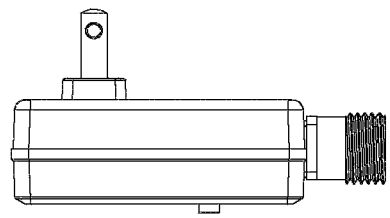
Figure 28A:
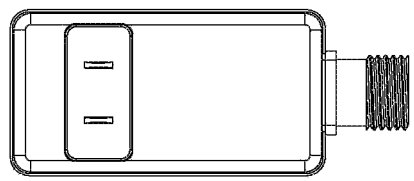
FIG. 28a to FIG. 28f are six-side views of the appearance of a twenty-second lamp control apparatus with multiple input modes.
Figure 28B:
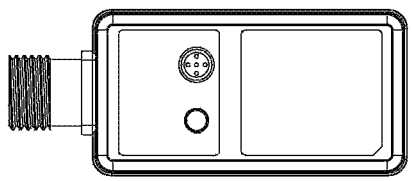
Figure 28C:
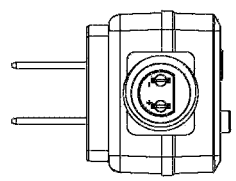
Figure 28D:
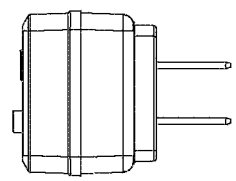
Figure 28E:
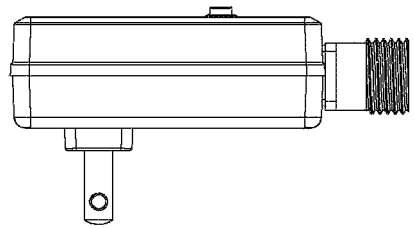
Figure 28F:
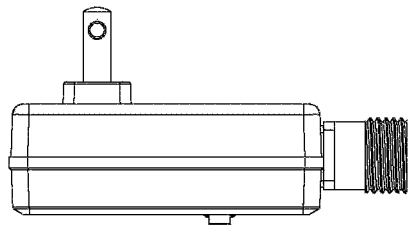
Figure 29A:
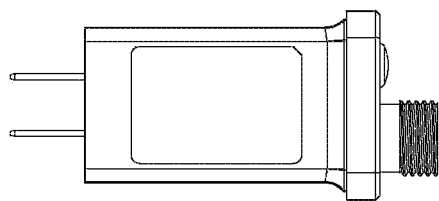
FIG. 29a to FIG. 29f are six-side views of the appearance of a twenty-third lamp control apparatus with multiple input modes.
Figure 29B:
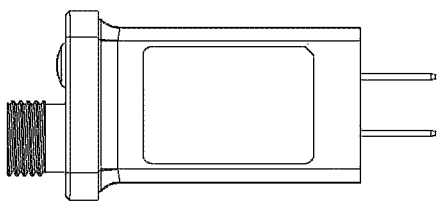
Figure 29C:
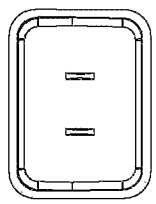
Figure 29D:
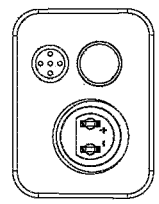
Figure 29E:
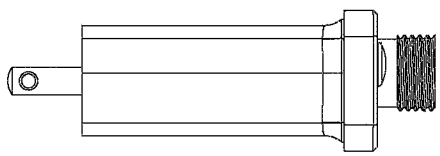
Figure 29F:
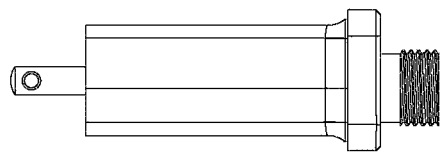
Figure 30A:
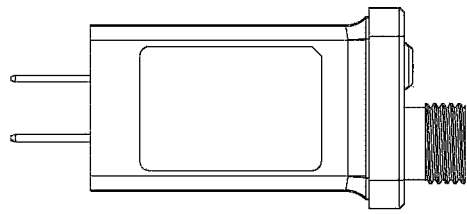
FIG. 30a to FIG. 30f are schematic diagrams of the appearance of a twenty-fourth lamp control apparatus with multiple input modes.
Figure 30B:
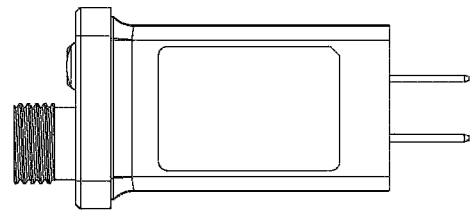
Figure 30C:
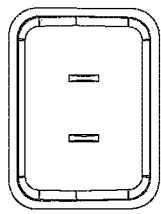
Figure 30D:
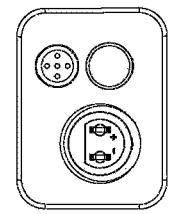
Figure 30E:
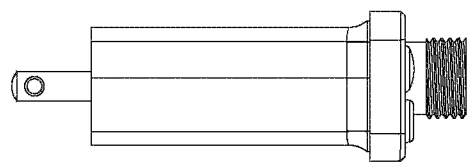
Figure 30F:
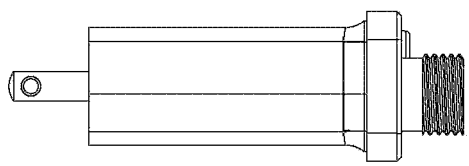
Figure 31A:
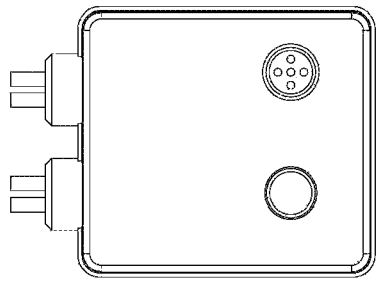
FIG. 31a to FIG. 31f are schematic diagrams of the appearance of a twenty-fifth lamp control apparatus with multiple input modes.
Figure 31B:
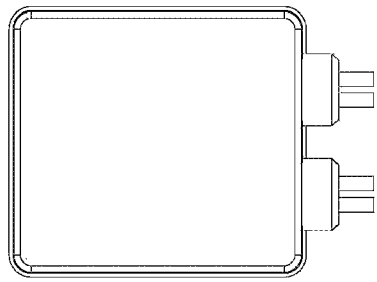
Figure 31C:
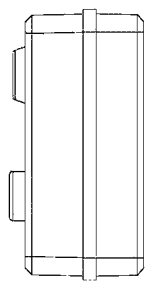
Figure 31D:
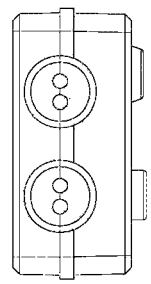
Figure 31E:
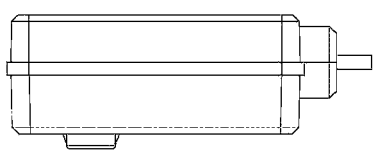
Figure 31F:
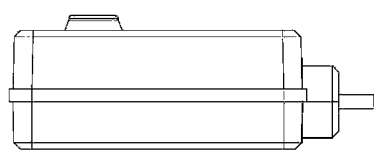
Figure 32A:
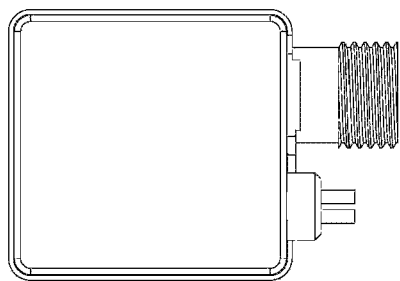
FIG. 32a to FIG. 32f are schematic diagrams of the appearance of a twenty-sixth lamp control apparatus with multiple input modes.
Figure 32B:
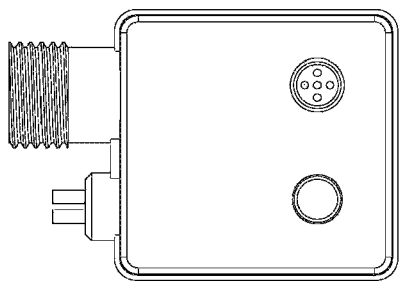
Figure 32C:
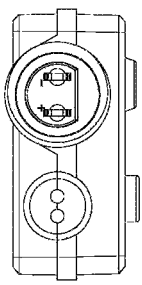
Figure 32D:
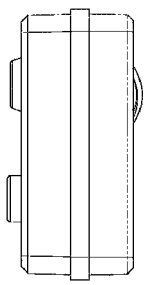
Figure 32E:
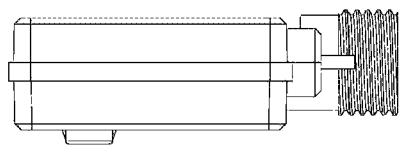
Figure 32F:
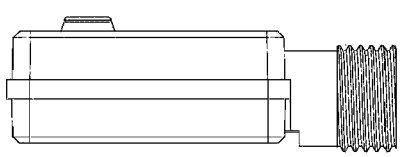

The bridge driving circuit in FIG. 1 is suitable to be connected in series with a common two-wire two-way LED lamp string shown in FIG. 4. The states of a first output end and a second output end of the microcontroller U2 determine the light emitting effect of two strings of LED lamps. The two strings of LED lamps work at duty cycles of D1 and D2 respectively. The relationship between the duty cycle and the brightness of the LED lamp is that the larger the duty cycle, the brighter the LED lamp. The maximum values of the duty cycles are D_Max. The values of both duty cycles are between 0 and D_Max. Different lighting effects can be achieved by different values. For example, when both duty cycles D1 and D2 are D_Max, both strings of lamps are brightest. When the duty cycles D1 and D2 are D_Max and 0 respectively, one string of lamps is bright, and the other string of lamps is dark. When the duty cycles D1 and D2 are respectively 0 and 0, both strings of lamps are dark. The value of period T is preferably chosen such that human eyes do not produce stroboscopic light when the strings of lamps are normally on. The duty cycles are set in the microcontroller U2 in advance. When the microcontroller U2 operates, the LED lamp strings flash according to the preset duty cycles.

Figure 2:
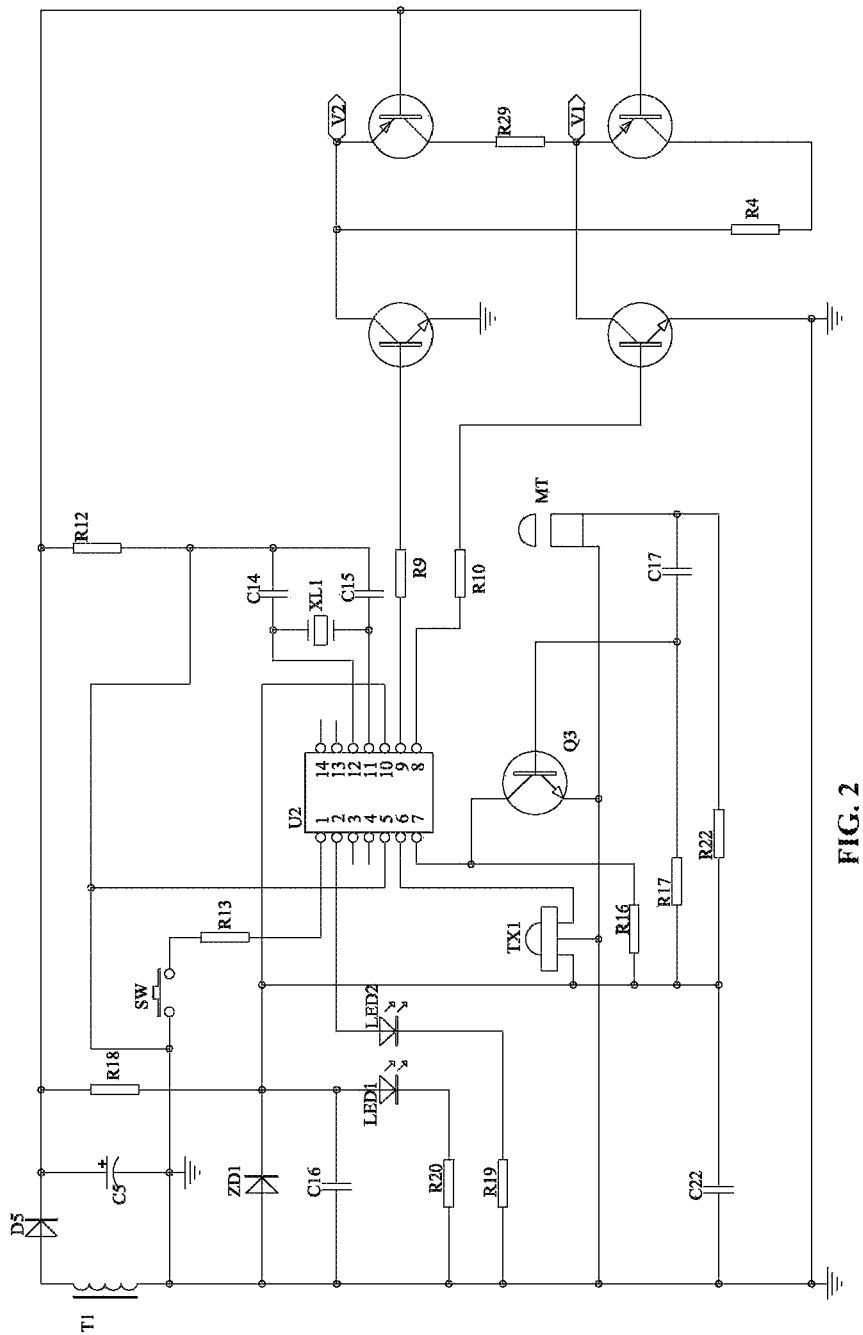
FIG. 2 is a schematic diagram of a second embodiment of a control circuit in a lamp control apparatus with multiple input modes.

The driving circuit shown in FIG. 2 includes a first triode Q1, a second triode Q2, and a voltage dividing resistor R29. A base electrode of the first triode Q1 is connected to a first output end of the microcontroller U2, an emitting electrode of the first triode Q1 is grounded, and a collecting electrode of the first triode Q1 is a control signal output end. The number of the first transistors Q1 may be one or more. In the present embodiment, the number of the first transistors Q1 is preferably two, and the two first transistors Q1 are connected in parallel. A high-power lamp string may be connected through two triodes Q1. A base electrode of the second triode Q2 is connected to a second output end of the microcontroller U2. An emitting electrode of the second triode Q2 is grounded. One end of the voltage dividing resistor R29 is connected to a collecting electrode of the second triode Q2, and the other end of the voltage dividing resistor R29 is connected to the control signal output end.

The sound-controlled flash mode input circuit includes a pickup device 4. The pickup device 4 is located inside the housing 1 and is fixed to the housing 1. One or more through holes 1a for transmitting oscillating waves to the pickup device are formed in the position where the pickup device is mounted on the housing 1. In the present embodiment, the position, where the pickup device is mounted, of the housing 1 includes an assembly cavity 1b arranged on the housing. After the pickup device 4 is in clearance fit in the assembly cavity 1b, an adhesive is injected into a clearance between the assembly cavity 1b and the pickup device 4, so that the pickup device 4 is fixed to the housing 1, and the pickup device 4 and the housing 1 are sealed. In this way, not only the pickup device 4 is fixed to the housing 1, but also the pickup device 4 forms part of a sealing structure which prevents liquid or gas passing through the through hole 1a from entering the housing.

After the oscillating waves in the external environment is transmitted to the pickup device 4 through the through hole 1a, the sound-controlled flash mode input circuit receives sound waves in the external environment and sends a command to the microcontroller U 2 to control the light emission of the light strings. The present utility model can control the flash mode through the flash mode switching module and the sound-controlled flash mode input circuit respectively. When the flash mode needs to be controlled by the sound-controlled flash mode input circuit, the flash mode switching module provides a switching signal determining that the flash trigger signal is from the sound-controlled flash mode input circuit for the control circuit, so that the sound-controlled flash mode input circuit can provide an input signal for the control circuit. The sound-controlled flash mode input circuit adopts an audio in the environment by the pickup device, so the present utility model has the advantages that an audio collection range, such as a calling sound and applause of a person, and the sound played by a trumpet, is expanded, and the operation is convenient when sound-controlled flash is used.

The present utility model communicates with the pickup device on the driving power supply through direct sound control of a person (for example, the applause), and the flash mode of the LED lamps is controlled through an instruction of the direct sound control of the person (for example, the applause), so that the present utility model is applied to the inside of the power supply or used independently. An LED output mode is adjusted and controlled through the direct sound control of the person (for example, the applause), which ensures that the remote control distance of a product reaches 10 m in the open air, the interconnection of the direct sound control of the person (for example, the applause) and the driving power supply is realized, and the light emitting states of the LED lamps are operated through the direct sound control of the person (for example, the applause), so that the operation of the product is not mechanized or limited, and the user can remotely and visually operate the light emitting states of the LED lamps.

The housing 1 includes a main housing 11 for accommodating the circuit board and a cover 12 matched with the main housing 11. The position where the pickup device 4 is mounted is located on the cover 12. When the controller is used, a cover surface usually faces an operator, so the pickup device 4 is mounted on the cover, which is not only easy to control, but also easily receives the oscillating waves in the external environment.

The cover 12 includes a cover body 12a and a convex part 12b or a concave part 12c arranged on an outer wall of the cover body 12a and corresponding to the position where the pickup device 4 is mounted. The through hole 1a is formed in the convex part 12b or the concave part 12c.

The sound-controlled flash mode input circuit further includes a sound-controlled flash mode input circuit. The flash mode switching module is connected to the control circuit, so as to provide a switching signal determining that a flash trigger signal is from the flash mode switching module or the sound-controlled flash mode input circuit for the control circuit. The sound-controlled flash mode input circuit includes a pickup device, a capacitor C17 electrically connected to the pickup device, and an amplifier Q3 electrically connected to the capacitor C17 and the control circuit. The capacitor C17 couples a signal picked up by the pickup device. The amplifier Q3 amplifies the signal coupled by the capacitor C17 and provides the amplified signal to the control circuit.

The amplifier Q3 is a triode. A base electrode of the amplifier Q3 is connected to the capacitor C17. An emitting diode of the amplifier Q3 is grounded. A collecting electrode of the amplifier Q3 is connected to an eighteenth resistor R18 through a bias resistor R16. The power supply provides a bias voltage for the amplifier Q3 through the eighteenth resistor R18 and the bias resistor R16. One end of a seventeenth resistor R17 is connected to the capacitor C17, and the other end of one end of the seventeenth resistor R17 is grounded through a twenty-second capacitor C22.

The sound-controlled flash mode input circuit further includes a power supply circuit. The power supply circuit includes a twenty-second resistor R22. One end of the twenty-second resistor R22 is electrically connected to the power supply, and the other end of the twenty-second resistor R22 is electrically connected to the pickup device.

The conventional sound recognition circuit cannot distinguish input signals of speech and noise. In a noisy environment, the input signal is usually a noise caused by a switch. In order to overcome the weaknesses, a speech circuit inhibits the above noise, which aims to use different speech and noise waveforms. The speech waveforms usually have a wide range of variations, while noise waveforms are more stable. Speech activation depends on the capacitor C17. The speech activation waveforms usually have a wide range of variations, while the noise waveforms are more stable, and the speech activation sensitivity is reduced.

After the flash mode switching module 3 is electrically connected to the control circuit, a switching signal determining that a flash trigger signal is from the flash mode switching module 3 or the sound-controlled flash mode input circuit is provided for the control circuit. Thus, whether the pickup device is turned on or not is determined by the flash mode switching module in the present embodiment. In the present utility model, the flash mode switching module can either change a flash mode or determine that the signal input into the microcontroller U2 is from the flash mode switching module or the sound-controlled flash mode input circuit. Therefore, the flash mode switching module has a function of switching on or off the sound-controlled flash mode input circuit. When the flash mode switching module is switched to input a signal into the microcontroller U2 through the sound-controlled flash mode input circuit, at the moment, the pickup device picks up the sound in the environment, and a control instruction output by the microcontroller U2 enables the flash effects of the LED lamp strings to vary along with the variation of a picked-up audio.

Since both the flash mode switching module 3 and the sound-controlled flash mode input circuit can provide a flash trigger signal for the control circuit, during working, only one of the flash mode switching module 3 and the sound-controlled flash mode input circuit can provide the flash trigger signal for the control circuit. Based on this, in the present embodiment, a specific selection right is given to the flash mode switching module 3, that is, a switching signal determining that the flash trigger signal is from the flash mode switching module or the sound-controlled flash mode input circuit is provided for the control circuit through the flash mode switching module 3. In the present embodiment, in addition to the flash mode switching module 3 having a function of selecting to provide the flash trigger signal for the control circuit, and the structures of the flash mode switching module 3 and the control circuit also have a function of controlling how a lamp flashes.

In the present embodiment, a plurality of flash modes and at least one flash trigger signal selection mode are built in the control circuit. When the control circuit works in a flash mode, each time the flash mode switching module 3 sends a pulse signal to the control circuit, the lamp varies a flash mode. In the present embodiment, the arrangement sequence of the plurality of flash modes and the flash trigger signal selection mode is as follows: a flash trigger signal is provided for the control circuit by default through the flash mode switching module 3 after start-up, at the moment, a plurality of flashes, for example, eight flashes, can be switched out through the flash mode switching module 3, and after eight pulse signals are sent, the flash trigger signal selection mode is reached, that is, the flash mode switching module 3 is switched to the sound control flash mode input circuit to provide the flash trigger signal for the control circuit at the moment.

The present utility model is not limited to the above manners. For example:

(a), the lamp control apparatus with multiple input modes further includes a flash input selection module. The flash input selection module is electrically connected to the control circuit, so that a switching signal determining that a flash trigger signal is from the flash mode switching module or the sound-controlled flash mode input circuit is provided for the control circuit. That is, whether to start the pickup device can also be determined by the flash input selection module, and switching can be freely realized by adding the flash input selection module. The pickup device does not need to be started only after selecting a flash mode by the flash mode switching module first when the switching is realized through the flash mode switching module as in the abovementioned embodiment, so that the added flash input selection module has the advantage of convenience in use. The flash input selection module may be a button, an infrared module, or a Bluetooth or WIFI module (B), the driving circuit shown in FIG. 2 is connected to a synchronous colorful RGB/LED light string shown in FIG. 5 or FIG. 6. Lamp beads of the synchronous colorful RGB/LED are coupled to a control signal by using a power cord. Three colors of R, G, and B are controlled by pulse signals of the power cord, so as to form seven color outputs of red, green, yellow, blue, purple, cyan, and white, which is very suitable to be applied to an LED photoelectric toy, various electronic products, etc., can save a large number of lamp connecting wire materials, and save the manual assembly cost. Synchronous hopping of any combination of the seven colors of Red (R), Green (G), Blue (B), Red Green (RG), Red Blue (RB), Green Blue (GB), and Red Green Blue (RGB) can be realized through programming. A chip internally includes circuits, such as a signal shaping/signal decoding circuit, a data latch, and an internal oscillator. The chip realizes the driving of corresponding colors by listening a control signal loaded by the power cord and decoding the control signal.

Figure 3:
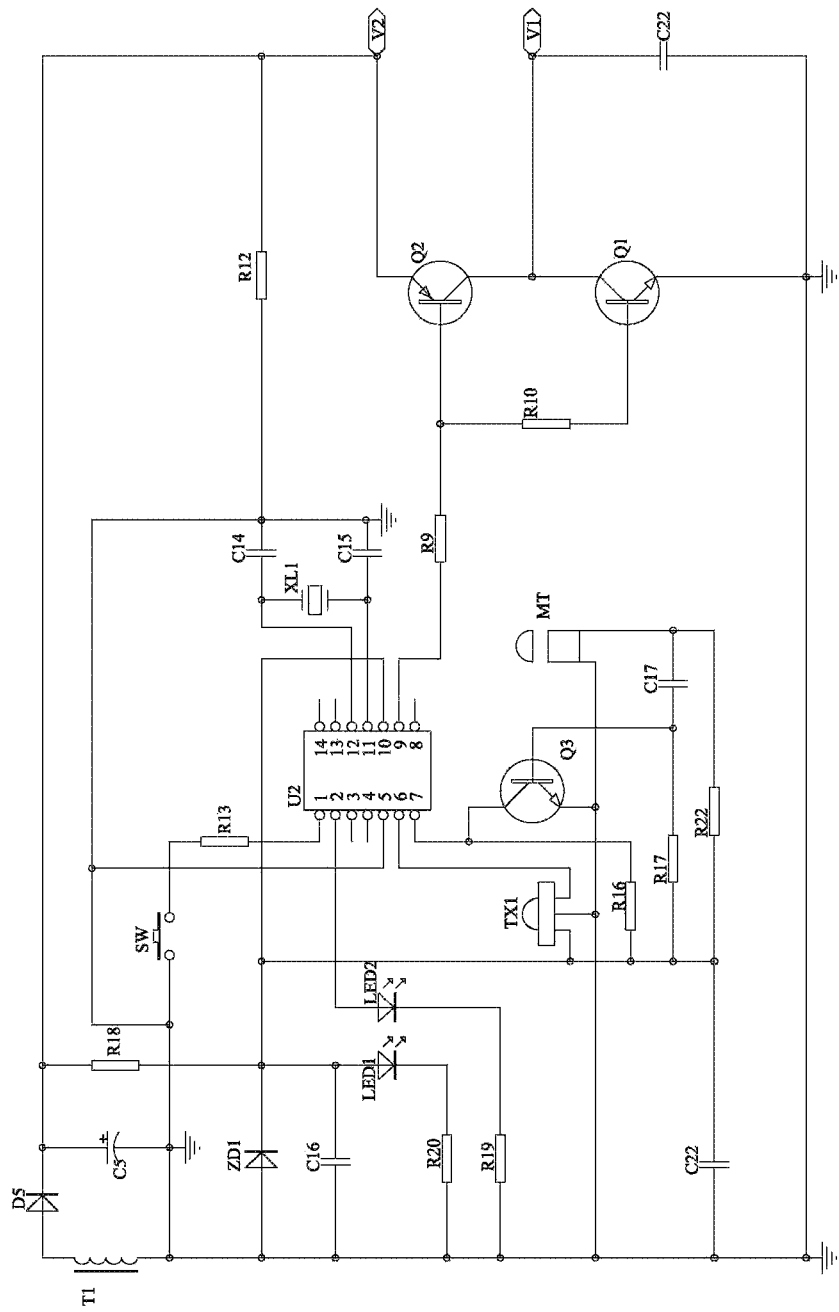
FIG. 3 is a schematic diagram of a third embodiment of a control circuit in a lamp control apparatus with multiple input modes.

(c), as shown in FIG. 3, the control circuit includes a microcontroller U2, and a driving circuit connected to an output end of the microcontroller U2. The driving circuit includes a first triode Q1 and a second triode Q2. A base electrode of the first triode Q1 is connected to a first output end of the microcontroller U2, an emitting electrode of the first triode Q1 is grounded, and a collecting electrode of the first triode Q1 is a control signal output end. A base electrode of the second triode Q2 is connected to a first output end of the microcontroller U2, an emitting electrode of the second triode Q2 is connected to a power supply, and a collecting electrode of the second triode Q2 is a control signal output end. The driving circuit shown in FIG. 3 is connected to a synchronous colorful RGB/LED light string shown in FIG. 5 or FIG. 6.

Based on the abovementioned embodiments, the present utility model further provides a lamp control apparatus with multiple input modes, including a power supply, and a lamp controller described as any of the abovementioned embodiments. The power supply is electrically connected to the control circuit in the lamp controller. The control circuit may include the power supply, or may not include the power supply. When the power supply is not arranged in the control circuit, the controller needs to be connected to an additional power supply.

After startup, a direct current switching power supply starts working, and the voltage transformed through a transformer T1 establishes a direct current voltage on a capacitor C5. The direct current voltage passing through the eighteenth resistor R18 supplies power to the microcontroller U2, the infrared controller TX1, and the pickup device after being stabilized through a voltage-stabilizing tube ZD1. The microcontroller U2 starts working, and two signals are output to the driving circuit through an eighth pin and a ninth pin of the microcontroller U2. The pulse widths of the output signals of the eighth pin and the ninth pin of the microcontroller U2 of the control chip can be changed at any time through the button SW or the infrared controller TX1, so as to change the fancy variation of the LED lamp strings. The driving circuit drives external LED lamps to work. The power supply enters a timing working mode and starts timing by pressing the button SW for 3 seconds. After 6 hours (or 8 hours), the power supply is turned off, and after another 18 hours (or 16 hours), the power supply works again. The cycle is repeated. If the variation of the flash is controlled by sound control, as described in detail above, it will not be described in detail herein.

What is claimed is:

1. A lamp control apparatus with multiple input modes, comprising a housing (1), a circuit board (2) arranged in the housing (1), a flash mode switching module (3), a sound-controlled flash mode input circuit for receiving external environment sound waves and sending a control command to a control circuit, wherein the control circuit for controlling a light emitting mode of a lamp is arranged on the circuit board; the flash mode switching module (3) and the sound-controlled flash mode input circuit are respectively and electrically connected to the control circuit; the sound-controlled flash mode input circuit includes a pickup device (4); the pickup device (4) is located inside the housing (1); and one or more through holes (1a) for transmitting the sound waves to the pickup device are formed in the position where the pickup device is mounted on the housing (1).

2. The lamp control apparatus with multiple input modes according to claim 1, wherein the pickup device (4) is fixed to the housing (1).

3. The lamp control apparatus with multiple input modes according to claim 2, wherein the position, where the pickup device is mounted, of the housing (1) comprises an assembly cavity (1b) arranged on the housing; and the pickup device (4) is in fit in the assembly cavity (1b).

4. The lamp control apparatus with multiple input modes according to claim 3, wherein after the pickup device (4) is in clearance fit in the assembly cavity (1b), an adhesive is injected into a clearance between the assembly cavity (1b) and the pickup device (4), so that the pickup device (4) is fixed to the housing (1), and the pickup device (4) and the housing (1) are sealed.

5. The lamp control apparatus with multiple input modes according to claim 1, wherein the housing (1) comprises a main housing (11) for accommodating the circuit board and a cover (12) matched with the main housing (11); and the position where the pickup device (4) is mounted is located on the cover (12).

6. The lamp control apparatus with multiple input modes according to claim 5, wherein the cover (12) comprises a cover body (12a) and a convex part (12b) or a concave part (12c) arranged on an outer wall of the cover body (12a) and corresponding to the position where the pickup device (4) is mounted; and the through hole (1a) is formed in the convex part (12b) or the concave part (12c).

7. The lamp control apparatus with multiple input modes according to claim 1, wherein the sound-controlled flash mode input circuit comprises:
   a capacitor (C17) electrically connected to the pickup device, the capacitor (C17) coupling a signal picked up by the pickup device;
   an amplifier (Q3) electrically connected to the capacitor (C17) and the control circuit, the amplifier (Q3) amplifying the signal coupled by the capacitor (C17) and providing the amplified signal to the control circuit; and
   a power supply circuit, comprising a twenty-second resistor (R22), one end of the twenty-second resistor (R22) being electrically connected to the power supply, and the other end of the twenty-second resistor (R22) being electrically connected to the pickup device.

8. The lamp control apparatus with multiple input modes according to claim 1, wherein after the flash mode switching module (3) is electrically connected to the control circuit, a switching signal determining that a flash trigger signal is from the flash mode switching module (3) or the sound-controlled flash mode input circuit is provided for the control circuit.

9. The lamp control apparatus with multiple input modes according to claim 1, further comprising a flash input selection module, wherein the flash input selection module is electrically connected to the control circuit, so that a switching signal determining that a flash trigger signal is from the flash mode switching module or the sound-controlled flash mode input circuit is provided for the control circuit.

10. A lamp control apparatus with multiple input modes, comprising a power supply, further comprising a lamp controller according to claim 1, wherein the power supply is electrically connected to the control circuit in the lamp controller.

* * * * *